United States Patent
Seki et al.

(10) Patent No.: US 8,962,514 B2
(45) Date of Patent: Feb. 24, 2015

(54) HYDROTREATING CATALYST, PROCESS FOR PRODUCING SAME, AND PROCESS FOR HYDROTREATING HYDROCARBON OIL

(75) Inventors: Hiroyuki Seki, Tokyo (JP); Yoshiaki Fukui, Tokyo (JP); Masanori Yoshida, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 595 days.

(21) Appl. No.: 13/138,774

(22) PCT Filed: Mar. 18, 2010

(86) PCT No.: PCT/JP2010/001934
§ 371 (c)(1),
(2), (4) Date: Sep. 22, 2011

(87) PCT Pub. No.: WO2010/109823
PCT Pub. Date: Sep. 30, 2010

(65) Prior Publication Data
US 2012/0018352 A1   Jan. 26, 2012

(30) Foreign Application Priority Data

Mar. 23, 2009   (JP) .................................. 2009-070587
Mar. 23, 2009   (JP) .................................. 2009-070589

(51) Int. Cl.

| | | |
|---|---|---|
| *B01J 23/882* | (2006.01) | |
| *B01J 23/883* | (2006.01) | |
| *C10G 45/08* | (2006.01) | |
| *B01J 21/12* | (2006.01) | |
| *B01J 35/00* | (2006.01) | |
| *B01J 37/02* | (2006.01) | |
| *B01J 37/20* | (2006.01) | |
| *B01J 27/18* | (2006.01) | |
| *B01J 37/00* | (2006.01) | |
| *B01J 37/03* | (2006.01) | |

(52) U.S. Cl.
CPC .............. *B01J 23/883* (2013.01); *B01J 23/882* (2013.01); *B01J 21/12* (2013.01); *B01J 35/002* (2013.01); *B01J 37/0203* (2013.01); *B01J 37/20* (2013.01); *C10G 45/08* (2013.01); *B01J 27/18* (2013.01); *B01J 37/0009* (2013.01); *B01J 37/0045* (2013.01); *B01J 37/031* (2013.01); *C10G 2300/207* (2013.01)
USPC ........... 502/206; 502/207; 502/211; 502/213; 502/214; 502/255; 502/258; 502/259; 502/260; 502/263; 208/216 R; 208/217

(58) Field of Classification Search
USPC .................. 502/206, 207.211, 213, 214, 255, 502/258–260, 263; 208/243–245, 248
See application file for complete search history.

(56) References Cited

U.S. PATENT DOCUMENTS

2006/0249429 A1*   11/2006   Iki et al. ........................ 208/209

FOREIGN PATENT DOCUMENTS

| CN | 1765509 | 5/2006 |
|---|---|---|
| CN | 101088605 | 12/2007 |
| GB | 1440230 | 6/1976 |
| JP | A-2000-354766 | 12/2000 |
| JP | A-2005-262063 | 9/2005 |
| JP | A-2008-173640 | 7/2008 |

OTHER PUBLICATIONS

Machine Translation of JP-2005262063, obtained from JPO website Jan. 29, 2014. 2005.*
European Search Report dated Apr. 3, 2013, issued in corresponding European Application No. EP 10755626.8.
Chinese Office Action dated Feb. 20, 2013, issued in corresponding Chinese Application No. CN 201080013125.8, and an English translation thereof.
International Search Report dated Jun. 8, 2010 issued in corresponding PCT Application No. PCT/JP2010/001934.
Applied Catalysis A: General, "The single-layered morphology of supported MoS2-based catalysts—The role of the cobalt promoter and its effects in the hydrodesulfurization of dibenzothiophene," published by Elsevier, 345, 2008, pp. 80 to 88.
Applied Catalysis A: General, "Promoting effects in hydrogenation and hydrodesulfurization reactions on the zirconia and titania supported catalysts," published by Elsevier, 257, 2004, pp. 157 to 164.

* cited by examiner

*Primary Examiner* — Renee E Robinson
(74) *Attorney, Agent, or Firm* — Kenyon & Kenyon LLP

(57) ABSTRACT

A hydrotreating catalyst that exhibits excellent levels of both desulfurization activity and denitrification activity. The hydrotreating catalyst is prepared by supporting molybdenum, cobalt and nickel on a carrier comprising aluminum, silicon, phosphorus and boron, and then performing a presulfiding treatment, and has an average stacking number for molybdenum sulfide slab that is greater than 1.0 but not more than 1.9. Also, a process for producing a hydrotreating catalyst that enables a hydrotreating catalyst having excellent levels of both desulfurization activity and denitrification activity to be produced with comparative ease. The process includes a first step of mixing an acidic aluminum salt aqueous solution and a basic aluminum salt aqueous solution in the presence of phosphate ions and silicate ions to achieve a pH of 6.5 to 9.5, thereby obtaining a hydrate, a second step of adding boron to the hydrate to prepare a carrier-forming material, a third step of molding and calcining the carrier-forming material to obtain a carrier, a fourth step of supporting molybdenum, cobalt and nickel on the carrier to obtain a catalyst precursor, and a fifth step of performing a presulfiding treatment by bringing the catalyst precursor into contact with a mixed gas containing hydrogen and hydrogen sulfide under conditions including a pressure of not less than 2.0 MPa and a maximum temperature of 240 to 380° C.

9 Claims, No Drawings

US 8,962,514 B2

HYDROTREATING CATALYST, PROCESS FOR PRODUCING SAME, AND PROCESS FOR HYDROTREATING HYDROCARBON OIL

TECHNICAL FIELD

The present invention relates to a hydrotreating catalyst for removing a sulfur content and a nitrogen content from a hydrocarbon oil in the presence of hydrogen, and a process for producing the hydrotreating catalyst. Further, the invention also relates to a hydrotreating process for removing a sulfur content and a nitrogen content from a hydrocarbon oil in the presence of hydrogen.

This application is a U.S. national stage application of International Application No. PCT/JP2010/001934, filed Mar. 18, 2010, which claims priority to Japanese Patent Application No. 2009-070587, filed Mar. 23, 2009, and Japanese Patent Application No. 2009-070589, filed Mar. 23, 2009, the contents of which are incorporated herein by reference.

BACKGROUND ART

In recent years, there have been growing demands for further reductions in the sulfur content in liquid fuels. In response to these demands, fuel oil producers have already investigated various processes for producing clean fuels. In particular, the adoption of a limit of not more than 10 ppm for the sulfur content of gasoline has lead to fuel oil producers introducing various countermeasures such as improved catalysts and expanded facilities.

Generally, the main base for gasoline is a cracked gasoline produced in a fluid catalytic cracker (FCC). Accordingly, in order to reduce the sulfur content in gasoline, reducing the sulfur content within this cracked gasoline is very important.

The sulfur content within a cracked gasoline is dependent on the sulfur content within the vacuum gas oil that functions as the FCC feedstock, and it is well known that a higher sulfur content within the vacuum gas oil results in a higher sulfur content within the cracked gasoline. Accordingly, in order to produce a clean gasoline having a low sulfur content, the sulfur content must first be removed from the vacuum gas oil that functions as the FCC feedstock.

In a hydrotreating process used for desulfurizing a vacuum gas oil (namely, a FCC pretreatment), a treatment is usually performed in which the vacuum gas oil is subjected to hydrotreating in a fixed bed reactor packed with a hydrotreating catalyst, under a stream of hydrogen gas and under conditions of high temperature and high pressure. A catalyst prepared by supporting an activated metal such as molybdenum or cobalt on a carrier such as alumina is widely used as the hydrotreating catalyst.

It is known that the desulfurization activity during hydrotreating is affected by the type of carrier used, and the type and amount of activated metal used. For example, Non-Patent Document 1 discloses the effects of the carrier (alumina or silica) and the activated metal (molybdenum or a mixture of molybdenum and cobalt). Further Non-Patent Document 2 describes the desulfurization activity of catalysts that use zirconia or titania as the carrier, and nickel or tungsten as the activated metal.

CITATION LIST

Non-Patent Document

Non-Patent Document 1: Applied Catalysis A: General, published by Elsevier, 345, 2008, pp. 80 to 88.

Non-Patent Document 2: Applied Catalysis A: General, published by Elsevier, 257, 2004, pp. 157 to 164.

DISCLOSURE OF INVENTION

Problems to be Solved by the Invention

However, a hydrotreating catalyst for a vacuum gas oil requires not only high desulfurization activity, but also a high denitrification activity. This is because the catalyst used in the FCC is poisoned by compounds containing nitrogen, resulting in a reduction in the yield of cracked gasoline.

Despite long years of research and improvements, there are currently no known hydrotreating catalysts that exhibit not only desulfurization activity, but also a high denitrification activity.

An object of the present invention is to provide a hydrotreating catalyst that exhibits excellent levels of both desulfurization activity and denitrification activity, and a process for producing such a hydrotreating catalyst. Further, another object of the present invention is to provide a process for hydrotreating a hydrocarbon oil that enables a sulfur content and a nitrogen content to be effectively removed. Moreover, yet another object of the present invention is to provide a process for producing a hydrotreating catalyst that enables a hydrotreating catalyst having excellent levels of both desulfurization activity and denitrification activity to be produced with comparative ease.

Means for Solving the Problem

The present invention adopts the aspects described below.
[1] A hydrotreating catalyst prepared by supporting molybdenum, cobalt and nickel on a carrier containing aluminum, silicon, phosphorus and boron, and then performing a presulfiding treatment, wherein
the average stacking number for molybdenum sulfide slab is greater than 1.0 but not more than 1.9.
[2] The hydrotreating catalyst according to [1], wherein the carrier contains: (a) an aluminum content, calculated as aluminum oxide ($Al_2O_3$), of not less than 75% by mass, (b) a silicon content, calculated as silicon oxide ($SiO_2$), of 0.2 to 10.0% by mass, (c) a phosphorus content, calculated as phosphorus oxide ($P_2O_5$), of 1.0 to 5.0% by mass, and (d) a boron content, calculated as boron oxide ($B_2O_3$), of 1.0 to 10.0% by mass (provided the mass of the overall carrier totals 100% by mass).
[3] The hydrotreating catalyst according to [1] or [2], wherein (e) a molybdenum content, calculated as molybdenum oxide ($MoO_3$), is from 10 to 23% by mass, (f) a cobalt content, calculated as cobalt oxide (CoO), is from 1.0 to 5.0% by mass, and (g) a nickel content, calculated as nickel oxide (NiO), is from 0.2 to 3.0% by mass (provided the mass of the overall hydrotreating catalyst totals 100% by mass).
[4] A process for producing a hydrotreating catalyst, the process including subjecting a catalyst precursor, prepared by supporting molybdenum, cobalt and nickel on a carrier containing aluminum, silicon, phosphorus and boron, to a presulfiding treatment such that the average stacking number for molybdenum sulfide slab following sulfidization is greater than 1.0 but not more than 1.9.
[5] A process for hydrotreating a hydrocarbon oil, the process including bringing the hydrocarbon oil into contact with the hydrotreating catalyst according to any one of [1] to [3] in the presence of hydrogen.

[6] A process for producing a hydrotreating catalyst, the process including:
a first step of mixing an acidic aluminum salt aqueous solution and a basic aluminum salt aqueous solution in the presence of phosphate ions and silicate ions to achieve a pH of 6.5 to 9.5, thereby obtaining a hydrate,
a second step of adding boron to the hydrate to prepare a carrier-forming material,
a third step of molding and calcining the carrier-forming material to obtain a carrier,
a fourth step of supporting molybdenum, cobalt and nickel on the carrier to obtain a catalyst precursor, and
a fifth step of performing a presulfiding treatment by bringing the catalyst precursor into contact with a mixed gas containing hydrogen and hydrogen sulfide under conditions including a pressure of not less than 2.0 MPa and a maximum temperature of 240 to 380° C.

[7] The process for producing a hydrotreating catalyst according to [6], wherein the supporting of molybdenum, cobalt and nickel on the carrier is performed in the presence of phosphoric acid and a carboxylic acid compound.

[8] The hydrotreating catalyst according to any one of [1] to [3], produced using the process according to [6] or [7].

Advantageous Effects of the Invention

The hydrotreating catalyst of the present invention exhibits excellent levels of both desulfurization activity and denitrification activity.

By using the process for producing a hydrotreating catalyst according to the present invention, a hydrotreating catalyst having excellent levels of both desulfurization activity and denitrification activity can be produced with comparative ease.

By employing the process for hydrotreating a hydrocarbon oil according to the present invention, the sulfur content and the nitrogen content within the hydrocarbon oil can be effectively removed.

BEST MODE FOR CARRYING OUT THE INVENTION

The present invention is described below in detail.

A hydrotreating catalyst according to a first aspect of the present invention is prepared by supporting molybdenum, cobalt and nickel on a carrier containing aluminum, silicon, phosphorus and boron, and then performing a presulfiding treatment.

The aluminum content within the carrier, calculated as aluminum oxide ($Al_2O_3$), is not less than 75% by mass, and is preferably 80% by mass or greater. If this oxide-equivalent aluminum content is less than 75% by mass, then the catalyst tends to be prone to degradation.

The silicon content within the carrier, calculated as silicon oxide ($SiO_2$), is within a range from 0.2 to 10.0% by mass, and is preferably from 0.5 to 6.0% by mass. If this oxide-equivalent silicon content is less than 0.2% by mass or greater than 10.0% by mass, then the molybdenum tends to aggregate, and the desulfurization activity and denitrification activity tend to deteriorate.

The phosphorus content within the carrier, calculated as phosphorus oxide ($P_2O_5$), is within a range from 1.0 to 5.0% by mass, and is preferably from 2.0 to 4.0% by mass. If this oxide-equivalent phosphorus content is less than 1.0% by mass or greater than 5.0% by mass, then the desulfurization activity tends to deteriorate.

The boron content within the carrier, calculated as boron oxide ($B_2O_3$), is within a range from 1.0 to 10.0% by mass, and is preferably from 3.0 to 7.0% by mass. If this oxide-equivalent boron content is less than 1.0% by mass, then satisfactory levels of desulfurization and denitrification activity are not obtained, whereas if the boron content exceeds 10.0% by mass, then the catalyst strength weakens, making practical application of the catalyst problematic.

Each of the above values for the aluminum, silicon, phosphorus and boron content is reported relative to a value of 100% by mass for the overall carrier.

The molybdenum content within the hydrotreating catalyst, calculated as molybdenum oxide ($MoO_3$), is within a range from 10 to 23% by mass, preferably from 12 to 22% by mass, and more preferably from 15 to 20% by mass. If this oxide-equivalent molybdenum content is less than 10% by mass or greater than 23% by mass, then the desulfurization activity and denitrification activity tend to deteriorate rapidly, making the catalyst impractical.

The cobalt content within the hydrotreating catalyst, calculated as cobalt oxide (CoO), is within a range from 1.0 to 5.0% by mass, and preferably from 2.0 to 4.0% by mass. If this oxide-equivalent cobalt content is less than 1.0% by mass, then the desulfurization activity tends to deteriorate significantly, whereas even if the cobalt content exceeds 5.0% by mass, no further improvement is apparent in the desulfurization activity.

The nickel content within the hydrotreating catalyst, calculated as nickel oxide (NiO), is within a range from 0.2 to 3.0% by mass. If this oxide-equivalent nickel content is less than 0.2% by mass, then the denitrification activity tends to deteriorate significantly, whereas if the nickel content exceeds 3.0% by mass, then the desulfurization activity deteriorates.

Each of the above values for the molybdenum, cobalt and nickel content is reported relative to a value of 100% by mass for the overall hydrotreating catalyst.

In the hydrotreating catalyst that has undergone the presulfiding treatment, molybdenum sulfide slab is formed in layers on the carrier surface.

The average stacking number for this molybdenum sulfide slab is greater than 1.0 but not more than 1.9, and is preferably within a range from 1.1 to 1.6. By ensuring that the average stacking number is not more than 1.9, a high desulfurization activity and a high denitrification activity can be achieved simultaneously. An average stacking number of 1.0 or less is unobtainable in practice.

The average stacking number for molybdenum sulfide slab is determined using the method described below.

Namely, a transmission electron microscope image of the hydrotreating catalyst is captured, and the number of stacked layers within each molybdenum sulfide slab is determined. Then, the average stacking number is calculated using the formula below.

(Average stacking number)=Σ(number of stacked layers $n$×number of molybdenum sulfide slab having $n$ stacked layers)/total number of measured molybdenum sulfide slab (wherein n is an integer of 1 or greater)

With the catalyst of the present invention, because a high desulfurization activity can be obtained, the volume of hydrocarbon oil treated in a hydrocarbon oil hydrotreating process can be increased. Moreover, because the denitrification activity is also high, when the hydrotreated hydrocarbon oil is subjected to subsequent catalytic cracking, degradation of the FCC catalyst can be prevented. Accordingly, the yield of cracked gasoline can be improved.

(Process for Producing Hydrotreating Catalyst)

A process for producing a hydrotreating catalyst according to the present invention involves subjecting a catalyst precursor, prepared by supporting molybdenum, cobalt and nickel on a carrier containing aluminum, silicon, phosphorus and boron, to a presulfiding treatment.

One example of the method used for supporting the activated metals on the carrier to prepare the catalyst precursor is an impregnation method. In this description, an "impregnation method" describes a method in which the carrier is impregnated with a solution of the activated metals, and is then dried and calcined.

In an impregnation method, the three metals, namely molybdenum, cobalt and nickel, are preferably supported simultaneously. If the metals are supported individually, then the desulfurization activity or the denitrification activity may be unsatisfactory. For example, if the molybdenum and cobalt are first supported simultaneously by impregnation, and the nickel is subsequently supported by impregnation, then the denitrification activity may weaken.

When the supporting is conducted via an impregnation method, the impregnation is preferably performed in the presence of phosphoric acid or a carboxylic acid compound, as this improves the dispersibility of the molybdenum on the carrier, further enhancing the desulfurization activity and denitrification activity of the resulting catalyst. In this case, from 3 to 25% by mass of phosphoric acid and from 35 to 75% by mass of the carboxylic acid compound are preferably added relative to a value of 100% by mass for the molybdenum oxide ($MoO_3$). Examples of the carboxylic acid compound include citric acid, malic acid, tartaric acid and gluconic acid.

The presulfiding treatment is, more specifically, a treatment in which the catalyst precursor is reacted with a sulfur compound (such as hydrogen sulfide or dimethyl disulfide) and hydrogen. This treatment causes the formation of stacked structures of molybdenum sulfide slab, thus generating activity.

This presulfiding treatment is adjusted so that the average stacking number for the molybdenum sulfide slab following the sulfidization treatment is greater than 1.0 but not more than 1.9. As described above, by ensuring that the average stacking number for the molybdenum sulfide slab is not more than 1.9, both the desulfurization activity and the denitrification activity can be increased.

Because the degree of sulfidization of the molybdenum sulfide and the stacking number for the molybdenum sulfide slab vary depending on the presulfiding treatment conditions, the treatment conditions such as the pressure (hydrogen partial pressure) and temperature are adjusted appropriately so that the average stacking number satisfies the range mentioned above.

Specifically, during the presulfiding treatment, the pressure is preferably set to not less than 2.0 MPa, and more preferably 3.0 MPa or greater. Provided the pressure is at least 2.0 MPa, the molybdenum can be adequately sulfidized, and the desulfurization activity and denitrification activity can be further enhanced. In this description, the term "pressure" refers to the gauge pressure.

Further, from the viewpoint of the pressure resistance of the presulfiding apparatus, the pressure during the presulfiding treatment is preferably not more than 150 MPa.

Furthermore, during the presulfiding treatment, the temperature is preferably within a range from 240 to 380° C., and more preferably from 250 to 350° C. Provided the temperature during the presulfiding treatment is at least 240° C., the molybdenum can be adequately sulfidized, whereas provided the temperature is not more than 380° C., the average stacking number for the molybdenum sulfide slab can be easily restricted to not more than 1.9.

(Hydrotreating Process)

A process for hydrotreating a hydrocarbon oil according to the present invention involves bringing the hydrocarbon oil into contact with the above-mentioned hydrotreating catalyst in the presence of hydrogen.

The hydrotreating catalyst is usually packed inside a fixed bed reactor.

Examples of hydrocarbon oils that can be refined by the hydrotreating process include gasoline, kerosene, gas oil and vacuum gas oil. Of these, vacuum gas oil is preferred in terms of having a high nitrogen content and therefore enabling maximum realization of the effects of the present invention.

A vacuum gas oil is a fraction obtained during treatment of an atmospheric residue in a vacuum distillation unit during petroleum refining, and contains not less than 70% by mass of a fraction with a boiling point of 340 to 550° C. There are no particular limitations on the oil subjected to atmospheric pressure distillation, and examples include petroleum-based crude oils, synthetic crude oils derived from oil sands, coal liquefaction oils, and bitumen reformates.

The reaction pressure (hydrogen partial pressure) during the hydrotreatment is preferably within a range from 3.0 to 15.0 MPa, and more preferably from 4.0 to 10.0 MPa. Provided the reaction pressure is at least 3.0 MPa, the desulfurization activity and denitrification activity can be further enhanced, whereas provided the reaction pressure is not more than 15.0 MPa, hydrogen consumption can be suppressed, and excessive increases in the operating costs can be avoided.

The reaction temperature is preferably within a range from 300 to 420° C., and more preferably from 330 to 410° C. Provided the reaction temperature is at least 300° C., the desulfurization activity and denitrification activity can be further enhanced, whereas provided the reaction temperature is not more than 420° C., catalyst degradation can be inhibited and the temperature remains lower than the heat-resistant temperature of the reaction unit (typically approximately 425° C.).

The liquid hourly space velocity is preferably within a range from 0.5 to 4.0 $h^{-1}$, and more preferably from 0.5 to 2.0 $h^{-1}$. Provided the liquid hourly space velocity is at least 0.5 $h^{-1}$, the process volume can be increased and productivity can be improved, whereas provided the liquid hourly space velocity is not more than 4.0 $h^{-1}$, the reaction temperature can be lowered and catalyst degradation can be suppressed.

The hydrogen/oil ratio is preferably within a range from 1,000 to 8,000 scfb (standard cubic feet per barrel), and more preferably from 1,500 to 5,000 scfb. Provided the hydrogen/oil ratio is at least 1,000 scfb, the desulfurization activity and denitrification activity can be further enhanced, whereas provided the hydrogen/oil ratio is not more than 8,000 scfb, increases in the operating costs can be suppressed.

In the process for hydrotreating a hydrocarbon oil according to the present invention, because the above-mentioned hydrotreating catalyst having excellent desulfurization activity and denitrification activity is used, the sulfur content and the nitrogen content within the hydrocarbon oil can be effectively removed.

The process for producing a hydrotreating catalyst that represents the second aspect of the present invention is a process for obtaining a hydrotreating catalyst by supporting molybdenum, cobalt and nickel on a carrier containing aluminum, silicon, phosphorus and boron, and then performing a presulfiding treatment. The process includes the first to fifth steps described below.

Namely, a first step of obtaining a hydrate, a second step of using the hydrate to prepare a carrier-forming material, a third step of using the carrier-forming material to obtain a carrier, a fourth step of using the carrier to obtain a catalyst precursor, and a fifth step of using the catalyst precursor to obtain a hydrotreating catalyst.

Each of these steps is described below.

(First Step)

In the first step, an acidic aluminum salt aqueous solution and a basic aluminum salt aqueous solution are mixed in the presence of phosphate ions and silicate ions to obtain a hydrate.

Specific examples of this step include (1) a method in which an acidic aluminum salt aqueous solution is added to a basic aluminum salt aqueous solution containing silicate ions and phosphate ions, and (2) a method in which a basic aluminum salt aqueous solution is added to an acidic aluminum salt aqueous solution containing silicate ions and phosphate ions.

Examples of salts that can be used favorably as the basic aluminum salt include sodium aluminate and potassium aluminate.

Further, examples of aqueous solutions that can be used favorably as the acidic aluminum salt aqueous solution include aqueous solutions of aluminum sulfate, aluminum chloride and aluminum nitrate.

The silicate ions and phosphate ions included in the basic aluminum salt aqueous solution may be either alkaline or neutral.

Examples of compounds that can be used as alkaline silicate ion sources include silicate compounds that generate silicate ions within water, such as sodium silicate.

Examples of compounds that can be used as alkaline phosphate ion sources include phosphate compounds that generate phosphate ions or phosphite ions within water, such as ammonium phosphate, potassium phosphate and sodium phosphate.

The silicate ions and phosphate ions included in the acidic aluminum salt aqueous solution may be either acidic or neutral.

Examples of compounds that can be used as acidic silicate ion sources include silicate compounds that generate silicate ions within water, such as silicic acid.

Examples of compounds that can be used as acidic phosphate ion sources include phosphate compounds that generate phosphate ions or phosphite ions within water, such as phosphoric acid and phosphorous acid.

Mixing the acidic aluminum salt aqueous solution and the basic aluminum salt aqueous solution yields a pH that is typically within a range from 6.5 to 9.5, preferably from 6.5 to 8.5, and still more preferably from 6.5 to 7.5. If the pH is less than 6.5, then the mixture is overly acidic, and a slurry-like hydrate is unobtainable, whereas if the pH exceeds 9.5, then the mixture is overly alkaline, and a slurry-like hydrate is unobtainable.

The mixing of the acidic aluminum salt aqueous solution and the basic aluminum salt aqueous solution typically yields a slurry-like hydrate.

One example of the first step is described below.

In this example, a predetermined amount of a basic aluminum salt aqueous solution containing silicate ions and phosphate ions is placed in a tank fitted with a stirrer, and is then heated and held at 40 to 90° C. An acidic aluminum salt aqueous solution is then added continuously to the heated basic aluminum salt aqueous solution, thereby generating a hydrate precipitate. During this period, the acidic aluminum salt aqueous solution is heated to a temperature that is preferably within ±5° C., more preferably within ±2° C., and still more preferably ±1° C., of the temperature of the basic aluminum salt aqueous solution. Further, the acidic aluminum salt aqueous solution is added in an amount that is sufficient to achieve a final pH for the mixed solution of 6.5 to 9.5. In terms of preventing the generation of undesirable crystals of pseudo-boehmite and bayerite, the addition time period for the acidic aluminum salt aqueous solution is preferably not longer than 15 minutes.

Subsequently, if necessary, the mixed solution may be aged and then washed to remove by-products, yielding a hydrate slurry.

(Second Step)

In the second step, boron is added to the hydrate obtained in the first step to prepare a carrier-forming material.

Examples of compounds that can be used as the boron source in this step include boric acid and ammonium borate.

Prior to addition of the boron, the slurry-like hydrate obtained in the first step is preferably kneaded under heating to concentrate the slurry to a predetermined water content.

One example of the second step is described below.

In this example, the hydrate slurry obtained in the first step is heated and aged, and is then subjected to kneading or the like under heating to concentrate the slurry to a predetermined water content. Subsequently, boric acid is added to the concentrated hydrate slurry, and the resulting mixture is once again kneaded under heating, thereby concentrating the mixture to a predetermined water content and obtaining a moldable carrier-forming material.

(Third Step)

In the third step, the carrier-forming material obtained in the second step is molded and calcined to obtain a carrier containing aluminum, silicon, phosphorus and boron.

Examples of the method used for molding the carrier-forming material include extrusion molding methods and compression molding methods.

The calcining temperature following molding is preferably within a range from 400 to 800° C. Provided the calcining temperature is at least 400° C., a reliable calcination can be achieved, and provided the temperature is not more than 800° C., the resulting carrier is suitable for use in a hydrotreating catalyst.

The calcination time is preferably within a range from 0.5 to 10 hours. Provided the calcination time is at least 0.5 hours, satisfactory calcination can be achieved, and provided the time is not longer than 10 hours, productivity can be improved.

Prior to the calcination, the molded item is preferably dried at a temperature of 70 to 150° C. Provided this drying temperature for the molded item is at least 70° C., rapid drying can be achieved, and provided the temperature is not more than 150° C., the resulting carrier is suitable for use in a hydrotreating catalyst.

(Fourth Step)

In the fourth step, molybdenum, cobalt and nickel are supported on the carrier obtained in the third step to obtain a catalyst precursor.

An example of the method used for supporting the activated metals on the carrier is the impregnation method. In this description, an impregnation method refers to a method in which the carrier is impregnated with a solution of the activated metals, and is then dried and calcined.

In the impregnation method, the three metals, namely molybdenum, cobalt and nickel, are preferably supported simultaneously. If the metals are supported individually, then the desulfurization activity or the denitrification activity may be unsatisfactory. For example, if the molybdenum and cobalt are first supported simultaneously by impregnation, and the nickel is subsequently supported by impregnation, then the denitrification activity may weaken.

When the supporting is conducted via an impregnation method, the impregnation is preferably performed in the presence of phosphoric acid or a carboxylic acid compound, as this improves the dispersibility of the molybdenum on the carrier, further enhancing the desulfurization activity and denitrification activity of the resulting catalyst. In this case, from 3 to 25% by mass of phosphoric acid ($P_2O_5$-equivalent) and from 35 to 75% by mass of the carboxylic acid compound are preferably added relative to a value of 100% by mass for the molybdenum oxide ($MoO_3$). Examples of the carboxylic acid compound include citric acid, malic acid, tartaric acid and gluconic acid.

(Fifth Step)

In the fifth step, a presulfiding treatment is performed by bringing the catalyst precursor obtained in the fourth step into contact with a mixed gas containing hydrogen and hydrogen sulfide. The presulfiding treatment causes the formation of stacked structures of molybdenum sulfide slab, thus generating activity.

During the presulfiding treatment, the pressure (hydrogen partial pressure) is preferably set to not less than 2.0 MPa, and more preferably 3.0 MPa or greater. Provided the pressure is at least 2.0 MPa, the molybdenum can be adequately sulfidized, and the desulfurization activity and denitrification activity can be further enhanced. In this description, the term "pressure" refers to the gauge pressure.

Further, from the viewpoint of the pressure resistance of the presulfiding apparatus, the pressure during the presulfiding treatment is preferably not more than 150 MPa.

Furthermore, during the presulfiding treatment, the temperature is preferably within a range from 240 to 380° C., and more preferably from 250 to 350° C. Provided the temperature during the presulfiding treatment is at least 240° C., the molybdenum can be adequately sulfidized, whereas provided the temperature is not more than 380° C., the desulfurization activity and denitrification activity can be more reliably enhanced.

In the resulting hydrotreating catalyst, the aluminum content within the carrier, calculated as aluminum oxide ($Al_2O_3$), is preferably not less than 75% by mass, and more preferably 80% by mass or greater. If this oxide-equivalent aluminum content is less than 75% by mass, then the catalyst tends to be prone to degradation.

Further, the silicon content within the carrier, calculated as silicon oxide ($SiO_2$), is preferably within a range from 0.2 to 10.0% by mass, and more preferably from 0.5 to 6.0% by mass. If this oxide-equivalent silicon content is less than 0.2% by mass or greater than 10.0% by mass, then the molybdenum tends to aggregate, and the desulfurization activity and denitrification activity tend to deteriorate.

Furthermore, the phosphorus content within the carrier, calculated as phosphorus oxide ($P_2O_5$), is preferably within a range from 1.0 to 5.0% by mass, and more preferably from 2.0 to 4.0% by mass. If this oxide-equivalent phosphorus content is less than 1.0% by mass or greater than 5.0% by mass, then the desulfurization activity tends to deteriorate.

Moreover, the boron content within the carrier, calculated as boron oxide ($B_2O_3$), is preferably within a range from 1.0 to 10.0% by mass, and preferably from 3.0 to 7.0% by mass. If this oxide-equivalent boron content is less than 1.0% by mass, then the desulfurization and denitrification activity may weaken, whereas if the boron content exceeds 10.0% by mass, then the catalyst tends to become brittle, making practical application of the catalyst problematic.

Each of the above values for the aluminum, silicon, phosphorus and boron content is reported relative to a value of 100% by mass for the final overall carrier.

The content values for the aluminum, silicon, phosphorus and boron can be adjusted by altering the amounts of phosphate ions and silicate ions, and the amounts of the acidic aluminum salt aqueous solution and the basic aluminum salt aqueous solution added in the first step, and by altering the amount of boron added in the second step.

Further, the molybdenum content within the hydrotreating catalyst, calculated as molybdenum oxide ($MoO_3$), is preferably within a range from 10 to 23% by mass, more preferably from 12 to 22% by mass, and still more preferably from 15 to 20% by mass. If this oxide-equivalent molybdenum content is less than 10% by mass or greater than 23% by mass, then the desulfurization activity and denitrification activity tend to deteriorate rapidly, making the catalyst impractical.

The cobalt content within the hydrotreating catalyst, calculated as cobalt oxide (CoO), is preferably within a range from 1.0 to 5.0% by mass, and more preferably from 2.0 to 4.0% by mass. If this oxide-equivalent cobalt content is less than 1.0% by mass, then the desulfurization activity tends to deteriorate significantly, whereas even if the cobalt content exceeds 5.0% by mass, no further improvement is apparent in the desulfurization activity.

The nickel content within the hydrotreating catalyst, calculated as nickel oxide (NiO), is preferably within a range from 0.2 to 3.0% by mass. If this oxide-equivalent nickel content is less than 0.2% by mass, then the denitrification activity tends to deteriorate significantly, whereas if the nickel content exceeds 3.0% by mass, then the desulfurization activity deteriorates.

Each of the above values for the molybdenum, cobalt and nickel content is reported relative to a value of 100% by mass for the overall hydrotreating catalyst.

The content values for the molybdenum, cobalt and nickel can be adjusted by altering the amounts of molybdenum, cobalt and nickel supported in the fourth step.

Further, in the resulting hydrotreating catalyst, molybdenum sulfide slab is formed in layers on the carrier surface.

The average stacking number for this molybdenum sulfide slab is greater than 1.0 but not more than 1.9, and is preferably within a range from 1.1 to 1.6. By ensuring that the average stacking number is not more than 1.9, a high desulfurization activity and a high denitrification activity can be achieved simultaneously. An average stacking number of 1.0 or less is unobtainable in practice.

The average stacking number for molybdenum sulfide slab is determined using the method described below.

Namely, a transmission electron microscope image of the hydrotreating catalyst is captured, and the number of stacked layers within each molybdenum sulfide slab is determined. Then, the average stacking number is calculated using the formula below.

(Average stacking number)=Σ(number of stacked layers $n$×number of molybdenum sulfide slab having $n$ stacked layers)/total number of measured molybdenum sulfide slab (wherein n is an integer of 1 or greater)

The degree of sulfidization of the molybdenum sulfide and the stacking number of the molybdenum sulfide slab vary depending on the conditions used during the presulfiding treatment, and therefore the average stacking number can be altered by appropriate selection of conditions such as the pressure (hydrogen partial pressure) and the temperature.

The process for producing a hydrotreating catalyst of the present invention described above enables a hydrotreating catalyst with excellent desulfurization activity to be produced with comparative ease. Accordingly, by using the obtained hydrotreating catalyst for hydrotreating a hydrocarbon oil, the volume of hydrocarbon oil treated can be increased. Moreover, because the denitrification activity of the hydrotreating catalyst obtained from the above production process is also high, when the hydrotreated hydrocarbon oil is subjected to subsequent catalytic cracking, degradation of the FCC catalyst can be prevented. Accordingly, the yield of cracked gasoline from the catalytic cracking can be improved.

(Process for Using Hydrotreating Catalyst)

The hydrotreating catalyst described above is used for hydrotreating a hydrocarbon oil by bringing the hydrocarbon oil into contact with the catalyst in the presence of hydrogen. The hydrotreating catalyst is usually packed inside a fixed bed reactor.

Examples of hydrocarbon oils that can be refined by the hydrotreating process include gasoline, kerosene, gas oil and vacuum gas oil. Of these, vacuum gas oil is preferred in terms of having a high nitrogen content and therefore enabling maximum realization of the effects of the present invention.

A vacuum gas oil is a fraction obtained during treatment of an atmospheric residue in a vacuum distillation unit during petroleum refining, and contains not less than 70% by mass of a fraction with a boiling point of 340 to 550° C. There are no particular limitations on the oil subjected to atmospheric pressure distillation, and examples include petroleum-based crude oils, synthetic crude oils derived from oil sands, coal liquefaction oils, and bitumen reformates.

The reaction pressure (hydrogen partial pressure) during the hydrotreatment is preferably within a range from 3.0 to 15.0 MPa, and more preferably from 4.0 to 10.0 MPa. Provided the reaction pressure is at least 3.0 MPa, the desulfurization activity and denitrification activity can be further enhanced, whereas provided the reaction pressure is not more than 15.0 MPa, hydrogen consumption can be suppressed, and excessive increases in the operating costs can be avoided.

The reaction temperature is preferably within a range from 300 to 420° C., and more preferably from 330 to 410° C. Provided the reaction temperature is at least 300° C., the desulfurization activity and denitrification activity can be further enhanced, whereas provided the reaction temperature is not more than 420° C., catalyst degradation can be inhibited and the temperature remains lower than the heat-resistant temperature of the reaction unit (typically approximately 425° C.).

The liquid hourly space velocity is preferably within a range from 0.5 to 4.0 $h^{-1}$, and more preferably from 0.5 to 2.0 $h^{-1}$. Provided the liquid hourly space velocity is at least 0.5 $h^{-1}$, the process volume can be increased and productivity can be improved, whereas provided the liquid hourly space velocity is not more than 4.0 $h^{-1}$, the reaction temperature can be lowered and catalyst degradation can be suppressed.

The hydrogen/oil ratio is preferably within a range from 1,000 to 8,000 scfb (standard cubic feet per barrel), and more preferably from 1,500 to 5,000 scfb. Provided the hydrogen/oil ratio is at least 1,000 scfb, the desulfurization activity and denitrification activity can be further enhanced, whereas provided the hydrogen/oil ratio is not more than 8,000 scfb, increases in the operating costs can be suppressed.

In the process for hydrotreating a hydrocarbon oil described above, because the above-mentioned hydrotreating catalyst having excellent desulfurization activity and denitrification activity is used, the sulfur content and the nitrogen content within the hydrocarbon oil can be effectively removed.

EXAMPLES

The present invention is described in more detail below based on a series of examples and comparative examples, but the present invention is in no way limited by the examples presented below.

Hydrotreating Catalyst of the First Aspect of the Present Invention

[Preparation of Catalyst Precursors]

(Catalyst Precursor 1)

A 100 L tank fitted with a steam jacket was charged with 8.55 kg of a sodium aluminate aqueous solution having an $Al_2O_3$-equivalent concentration of 22% by mass, and the aqueous solution was then diluted with 29 kg of ion-exchanged water. Subsequently, 3.6 kg of a trisodium phosphate solution with a $P_2O_5$-equivalent concentration of 2.5% by mass and 1.8 kg of a sodium silicate solution with a $SiO_2$-equivalent concentration of 5.0% by mass were added to the tank under constant stirring, and the resulting mixed solution was heated to 60° C. to obtain a carrier preparation solution.

Further, a separate 50 L container was charged with 13.43 kg of an aluminum sulfate aqueous solution having an $Al_2O_3$-equivalent concentration of 7% by mass, and the aqueous solution was then diluted with 24 kg of ion-exchanged water. Subsequently, using a roller pump, the diluted aluminum sulfate solution was added to the above-mentioned carrier preparation solution at a constant rate until a pH of 7.2 was reached, thus preparing a hydrate slurry.

The thus obtained slurry was aged for one hour at 60° C. under constant stirring, was subsequently dewatered using a flat filter, and was then washed with 150 L of a 0.3% by mass aqueous solution of ammonia. The washed cake-like slurry was diluted with ion-exchanged water to achieve an $Al_2O_3$ concentration of 10% by mass, and the pH was then adjusted to 10.5 by adding 15% by mass ammonia water.

The resulting pH-adjusted slurry was transferred to an ageing tank fitted with a reflux condenser, and the slurry was then heated at 95° C. for 10 hours under constant stirring. Following completion of ageing, the slurry was dewatered, and a double arm kneader fitted with a steam jacket was then used to knead the slurry while the water content was concentrated down to a predetermined level. Subsequently, 280 g of boric acid was added, and the resulting mixture was once again kneaded while the water content was concentrated down to a predetermined level. The obtained kneaded product was molded into circular cylindrical pellets having a diameter of 1.8 mm and a length of 2 to 3 mm using an extrusion molding apparatus, and the molded pellets were dried at 110° C. Subsequently, the dried molded product was calcined for 3 hours at a temperature of 550° C. in an electric furnace, thus yielding a carrier. The $SiO_2$ concentration within the carrier was 2.8% by mass, the $P_2O_5$ concentration was 2.8% by mass, and the $B_2O_3$ concentration was 5.0% by mass.

Next, 235 g of molybdenum trioxide, 24 g of basic nickel carbonate and 75 g of basic cobalt carbonate were suspended in 500 ml of ion-exchanged water, and the resulting suspension was heated under reflux for 5 hours at 95° C., ensuring that there was no reduction in the liquid volume. Subsequently, 147 g of citric acid and 21 g of phosphoric acid were added to, and dissolved in, the heated suspension to prepare an impregnation liquid, and this impregnation liquid was then sprayed onto and impregnated into 1,000 g of the above-mentioned carrier. The resulting impregnated carrier was dried, and then calcined for one hour at 550° C. in an electric furnace, yielding a catalyst precursor 1. The activated metal components within the catalyst precursor 1 were 18.0% by mass of $MoO_3$, 3.5% by mass of CoO and 1.0% by mass of NiO.

(Catalyst Precursor 2)

With the exception of using 147 g of malic acid instead of the citric acid during preparation of the impregnation liquid, a catalyst precursor 2 was obtained using the same preparation method as that described above for the catalyst precursor 1. The activated metal components within the catalyst precursor 2 were 18.0% by mass of $MoO_3$, 3.5% by mass of CoO and 1.0% by mass of NiO.

(Catalyst Precursor 3)

235 g of molybdenum trioxide, 12 g of basic nickel carbonate and 86 g of basic cobalt carbonate were suspended in 500 ml of ion-exchanged water, and the resulting suspension was heated under reflux for 5 hours at 95° C., ensuring that there was no reduction in the liquid volume. Subsequently, 147 g of citric acid and 21 g of phosphoric acid were added to, and dissolved in, the heated suspension to prepare an impregnation liquid, and this impregnation liquid was then sprayed onto and impregnated into 1,000 g of the same carrier as that used in the catalyst precursor 1. Calcination was then performed in the same manner as that described for the preparation of the catalyst precursor 1, yielding a catalyst precursor 3. The activated metal components within the catalyst precursor 3 were 18.0% by mass of $MoO_3$, 4.0% by mass of CoO and 0.5% by mass of NiO.

(Catalyst Precursor 4)

A 100 L tank fitted with a steam jacket was charged with 8.18 kg of a sodium aluminate aqueous solution having an $Al_2O_3$-equivalent concentration of 22% by mass, and the aqueous solution was then diluted with 28 kg of ion-exchanged water. Subsequently, 4.8 kg of a trisodium phosphate solution with a $P_2O_5$-equivalent concentration of 2.5% by mass and 3.6 kg of a sodium silicate solution with a $SiO_2$-equivalent concentration of 5.0% by mass were added to the tank under constant stirring, and the resulting mixed solution was heated to 60° C. to obtain a carrier preparation solution.

Further, a separate 50 L container was charged with 12.86 kg of an aluminum sulfate aqueous solution having an $Al_2O_3$-equivalent concentration of 7% by mass, and the aqueous solution was then diluted with 23 kg of ion-exchanged water. Subsequently, using a roller pump, the diluted aluminum sulfate solution was added to the above-mentioned carrier preparation solution at a constant rate until a pH of 7.2 was reached, thus preparing a hydrate slurry.

The thus obtained slurry was aged for one hour at 60° C. under constant stirring, was subsequently dewatered using a flat filter, and was then washed with 150 L of a 0.3% by mass aqueous solution of ammonia. The washed cake-like slurry was diluted with ion-exchanged water to achieve an $Al_2O_3$ concentration of 10% by mass, and the pH was then adjusted to 10.5 by adding 22% by mass ammonia water.

The resulting pH-adjusted slurry was transferred to an ageing tank fitted with a reflux condenser, and the slurry was then heated at 95° C. for 10 hours under constant stirring. Following completion of ageing, the slurry was dewatered, and a double arm kneader fitted with a steam jacket was then used to knead the slurry while the water content was concentrated down to a predetermined level. Subsequently, 340 g of boric acid was added, and the resulting mixture was once again kneaded while the water content was concentrated down to a predetermined level. The obtained kneaded product was molded into circular cylindrical pellets having a diameter of 1.8 mm and a length of 2 to 3 mm using an extrusion molding apparatus, and the molded pellets were dried at 110° C. Subsequently, the dried molded product was calcined for 3 hours at a temperature of 550° C. in an electric furnace, thus yielding a carrier. The $SiO_2$ concentration within this carrier was 5.6% by mass, the $P_2O_5$ concentration was 3.8% by mass, and the $B_2O_3$ concentration was 6.0% by mass.

A catalyst precursor 4 was then prepared using the same subsequent steps as those described for the preparation of the catalyst precursor 1.

(Catalyst Precursor 5)

With the exception of not using the boric acid in the carrier preparation, a catalyst precursor 5 was obtained using the same preparation method as that described above for the catalyst precursor 2.

(Catalyst Precursor 6)

With the exception of not using the trisodium phosphate in the carrier preparation, a catalyst precursor 6 was obtained using the same preparation method as that described above for the catalyst precursor 2.

(Catalyst Precursor 7)

With the exception of not using the sodium silicate in the carrier preparation, a catalyst precursor 7 was obtained using the same preparation method as that described above for the catalyst precursor 2.

(Catalyst Precursor 8)

With the exception of not using the basic nickel carbonate in the metal supporting step, a catalyst precursor 8 was obtained using the same preparation method as that described above for the catalyst precursor 2.

(Catalyst Precursor 9)

With the exception of not using the basic cobalt carbonate in the metal supporting step, a catalyst precursor 9 was obtained using the same preparation method as that described above for the catalyst precursor 2.

[Presulfiding Methods]

(Sulfiding Method 1)

A recirculating fixed bed reactor was packed with 100 ml of the catalyst precursor, and a mixed gas (hydrogen: hydrogen sulfide=97:3 volume %) was passed through the reactor at a flow rate of 30 L/hour, while the temperature of the reactor was raised from room temperature at a rate of 10° C./minute under a total pressure of 6 MPa. Subsequently, the temperature was held at 240° C. for 4 hours, and the temperature was then further increased to 340° C. The temperature was then held at 340° C. for 24 hours to complete the presulfiding treatment.

(Sulfiding Method 2)

With the exception of increasing the final temperature to 400° C., a presulfiding treatment was performed in the same manner as the sulfiding method 1.

[Method of Determining Average Stacking Number]

Following completion of the presulfiding treatment, the reactor was cooled to room temperature, and the circulating gas was changed from the mixed gas to nitrogen. The pressure was lowered to atmospheric pressure, and following closing of the valves at the inlet and outlet of the reactor, the reactor was removed. The presulfidized catalyst was removed from the reactor inside a nitrogen-filled glove box, and approximately 10 g of the catalyst was pulverized to a size of not more than 20 mesh. The resulting catalyst powder was stored inside a sample container under a nitrogen atmosphere.

The stacking number of the molybdenum sulfide slab within the sulfidized catalyst was measured by inspection of a transmission electron microscope (TEM) image.

The average stacking number was determined using the formula below.

(Average stacking number)=Σ(number of stacked layers n×number of molybdenum sulfide slab having n stacked layers)/total number of measured molybdenum sulfide slab (wherein n is an integer of 1 or greater)
[Hydrotreating of Hydrocarbon Oil]

Example 1

The catalyst precursor 1 (100 ml) was packed in a fixed bed reactor and subjected to a presulfiding treatment using the sulfiding method 1. Subsequently, a vacuum gas oil (boiling point range: 343 to 550° C., sulfur content: 2.44% by mass, nitrogen content: 0.085% by mass) was supplied to the fixed bed reactor at a rate of 200 ml/hour to effect hydrotreatment. The reaction conditions during the hydrotreatment included a hydrogen partial pressure of 6 MPa, a liquid hourly space velocity of 2.0 $h^{-1}$, a hydrogen/oil ratio of 2,500 scfb, and a reaction temperature of either 340° C. or 360° C.

The results for the desulfurization rate and denitrification rate at each of the reaction temperatures are shown in Table 1.

The desulfurization rate was calculated using the formula: (sulfur content removed by hydrotreating/sulfur content within vacuum gas oil)×100(%). The denitrification rate was calculated using the formula: (nitrogen content removed by hydrotreating/nitrogen content within vacuum gas oil)×100 (%).

Example 2

With the exception of using the catalyst precursor 2 instead of the catalyst precursor 1, a hydrotreatment was performed in the same manner as Example 1. The results for the desulfurization rate and denitrification rate at each of the reaction temperatures are shown in Table 1.

Example 3

With the exception of using the catalyst precursor 3 instead of the catalyst precursor 1, a hydrotreatment was performed in the same manner as Example 1. The results for the desulfurization rate and denitrification rate at each of the reaction temperatures are shown in Table 1.

Example 4

With the exception of using the catalyst precursor 4 instead of the catalyst precursor 1, a hydrotreatment was performed in the same manner as Example 1. The results for the desulfurization rate and denitrification rate at each of the reaction temperatures are shown in Table 1.

Comparative Example 1

With the exception of using the catalyst precursor 5 instead of the catalyst precursor 1, a hydrotreatment was performed in the same manner as Example 1. The results for the desulfurization rate and denitrification rate at each of the reaction temperatures are shown in Table 1.

Comparative Example 2

With the exception of using the catalyst precursor 6 instead of the catalyst precursor 1, a hydrotreatment was performed in the same manner as Example 1. The results for the desulfurization rate and denitrification rate at each of the reaction temperatures are shown in Table 1.

Comparative Example 3

With the exception of using the catalyst precursor 7 instead of the catalyst precursor 1, a hydrotreatment was performed in the same manner as Example 1. The results for the desulfurization rate and denitrification rate at each of the reaction temperatures are shown in Table 1.

Comparative Example 4

With the exception of using the catalyst precursor 8 instead of the catalyst precursor 1, a hydrotreatment was performed in the same manner as Example 1. The results for the desulfurization rate and denitrification rate at each of the reaction temperatures are shown in Table 1.

Comparative Example 5

With the exception of using the catalyst precursor 9 instead of the catalyst precursor 1, a hydrotreatment was performed in the same manner as Example 1. The results for the desulfurization rate and denitrification rate at each of the reaction temperatures are shown in Table 1.

Comparative Example 6

With the exception of using the sulfiding method 2 instead of the sulfiding method 1 for the presulfiding treatment, a hydrotreatment was performed in the same manner as Example 1. The results for the desulfurization rate and denitrification rate at each of the reaction temperatures are shown in Table 1.

TABLE 1

| | Average stacking number | Desulfurization rate (% by mass) | | Denitrification rate (% by mass) | |
|---|---|---|---|---|---|
| | | 340° C. | 360° C. | 340° C. | 360° C. |
| Example 1 | 1.2 | 79 | 91 | 25 | 43 |
| Example 2 | 1.4 | 76 | 89 | 24 | 42 |
| Example 3 | 1.3 | 77 | 90 | 23 | 41 |
| Example 4 | 1.3 | 78 | 91 | 24 | 43 |
| Comparative Example 1 | 1.8 | 74 | 87 | 19 | 36 |
| Comparative Example 2 | 1.5 | 73 | 87 | 20 | 37 |
| Comparative Example 3 | 2.2 | 69 | 85 | 19 | 36 |
| Comparative Example 4 | 1.4 | 75 | 88 | 20 | 37 |
| Comparative Example 5 | 1.5 | 65 | 79 | 18 | 36 |
| Comparative Example 6 | 2.8 | 69 | 86 | 20 | 37 |

By employing the hydrotreating catalysts of Examples 1 to 4, each of which was prepared by presulfiding a catalyst precursor obtained by supporting molybdenum, cobalt and nickel on a carrier containing aluminum, silicon and boron, and had an average stacking number for molybdenum sulfide slab that was greater than 1.0 but not more than 1.9, the sulfur content and the nitrogen content within the vacuum gas oil were able to be effectively removed.

In the case of the hydrotreating catalyst of Comparative Example 1 that did not include boron as a carrier component, the hydrotreating catalyst of Comparative Example 2 that did not include phosphorus as a carrier component, and the hydrotreating catalyst of Comparative Example 3 that did not include silicon as a carrier component, the denitrification rate was lower than that observed in the examples. Further, the desulfurization rate was also lower for the catalyst of Comparative Example 3.

In the case of the hydrotreating catalyst of Comparative Example 4 that did not include nickel as an activated metal component, and the hydrotreating catalyst of Comparative Example 5 that did not include cobalt as an activated metal component, the denitrification rate was lower than that observed in the examples. Further, the desulfurization rate was also lower for the catalyst of Comparative Example 5.

In the case of the hydrotreating catalyst of Comparative Example 6, which was prepared by presulfiding a catalyst precursor obtained by supporting molybdenum, cobalt and nickel on a carrier containing aluminum, silicon and boron, but had an average stacking number for molybdenum sulfide slab that exceeded 1.9, both the desulfurization rate and the denitrification rate were lower than those observed in the examples.

Process for Producing Hydrotreating Catalyst of the Second Aspect of the Present Invention Example 5

Preparation of Hydrotreating Catalyst a (First Step)
A 100 L tank fitted with a steam jacket was charged with 8.55 kg of a sodium aluminate aqueous solution having an $Al_2O_3$-equivalent concentration of 22% by mass, and the aqueous solution was then diluted with 29 kg of ion-exchanged water. Subsequently, 3.6 kg of a trisodium phosphate solution with a $P_2O_5$-equivalent concentration of 2.5% by mass and 1.8 kg of a sodium silicate solution with a $SiO_2$-equivalent concentration of 5.0% by mass were added to the tank under constant stirring, and the resulting mixed solution was heated to 60° C. to obtain a carrier preparation solution.

Further, a separate 50 L container was charged with 13.43 kg of an aluminum sulfate aqueous solution having an $Al_2O_3$-equivalent concentration of 7% by mass, and the aqueous solution was then diluted with 24 kg of ion-exchanged water. Subsequently, using a roller pump, the diluted aluminum sulfate solution was added to the above-mentioned carrier preparation solution at a constant rate until a pH of 7.2 was reached, thus preparing a hydrate slurry a1.

(Second Step)
The obtained hydrate slurry a1 was aged for one hour at 60° C. under constant stirring, was subsequently dewatered using a flat filter, and was then washed with 150 L of a 0.3% by mass aqueous solution of ammonia. The washed cake-like slurry was diluted with ion-exchanged water to achieve an $Al_2O_3$ concentration of 10% by mass, and the pH was then adjusted to 10.5 by adding 15% by mass ammonia water.

The resulting pH-adjusted slurry was transferred to an ageing tank fitted with a reflux condenser, and the slurry was then heated at 95° C. for 10 hours under constant stirring. Following completion of ageing, the slurry was dewatered, and a double arm kneader fitted with a steam jacket was then used to knead the slurry while the water content was concentrated down to a predetermined level. Subsequently, 280 g of boric acid was added, and the resulting mixture was once again kneaded while the water content was concentrated down to a predetermined level, thus yielding a carrier-forming material a2.

(Third Step)
The obtained carrier-forming material a2 was molded into circular cylindrical pellets having a diameter of 1.8 mm and a length of 2 to 3 mm using an extrusion molding apparatus, and the molded pellets were then dried at 110° C. Subsequently, the dried molded product was calcined for 3 hours at a temperature of 550° C. in an electric furnace, thus yielding a carrier a3. The $SiO_2$ concentration within the carrier a3 was 2.8% by mass, the $P_2O_5$ concentration was 2.8% by mass, and the $B_2O_3$ concentration was 5.0% by mass.

(Fourth Step)
Next, 235 g of molybdenum trioxide, 24 g of nickel carbonate and 75 g of cobalt carbonate were suspended in 500 ml of ion-exchanged water, and the resulting suspension was heated under reflux for 5 hours at 95° C., ensuring that there was no reduction in the liquid volume. Subsequently, 147 g of citric acid and 21 g of phosphoric acid were added to, and dissolved in, the heated suspension to prepare an impregnation liquid, and this impregnation liquid was then sprayed onto and impregnated into 1,000 g of the carrier 3a. The resulting impregnated carrier was dried, and then calcined for one hour at 550° C. in an electric furnace, yielding a catalyst precursor a4.

(Fifth Step)
A recirculating fixed bed reactor was packed with 100 ml of the catalyst precursor a4, and a mixed gas (hydrogen:hydrogen sulfide=97:3 volume %) was passed through the reactor at a flow rate of 30 L/hour, while the temperature of the reactor was raised from room temperature at a rate of 10° C./minute under a total pressure of 6 MPa. Subsequently, the temperature was held at 240° C. for 4 hours, and the temperature was then further increased to 340° C. The temperature was then held at 340° C. for 24 hours to complete the presulfiding treatment. This treatment yielded a hydrotreating catalyst a.

For the activated metal components within the hydrotreating catalyst a, the molybdenum had a $MoO_3$-equivalent concentration of 18.0% by mass, the cobalt had a CoO-equivalent concentration of 3.5% by mass, and the nickel had a NiO-equivalent concentration of 1.0% by mass.

Furthermore, the average stacking number for molybdenum sulfide slab, determined using the method described below, was 1.2.

<Method of Determining Average Stacking Number>
Following completion of the presulfiding treatment, the reactor was cooled to room temperature, and the circulating gas was changed from the mixed gas to nitrogen. The pressure was lowered to atmospheric pressure, and following closing of the valves at the inlet and outlet of the reactor, the reactor was removed. The presulfidized catalyst was removed from the reactor inside a nitrogen-filled glove box, and approximately 10 g of the catalyst was pulverized to a size of not more than 20 mesh. The resulting catalyst powder was stored inside a sample container under a nitrogen atmosphere.

The stacking number of the molybdenum sulfide slab within the sulfidized catalyst was measured by inspection of a transmission electron microscope (TEM) image.

The average stacking number was determined using the formula below.

(Average stacking number)=Σ(number of stacked layers $n$×number of molybdenum sulfide slab having $n$ stacked layers)/total number of measured molybdenum sulfide slab (wherein n is an integer of 1 or greater)

Example 6

Preparation of Hydrotreating Catalyst b

With the exception of using 147 g of malic acid instead of the citric acid during preparation of the impregnation liquid in the fourth step, a hydrotreating catalyst b was prepared in the same manner as Example 5. For the activated metal components within the hydrotreating catalyst b, the molybdenum had a $MoO_3$-equivalent concentration of 18.0% by mass, the cobalt had a CoO-equivalent concentration of 3.5% by mass, and the nickel had a NiO-equivalent concentration of 1.0% by mass. Further, the average stacking number for molybdenum sulfide slab was 1.4.

Example 7

Preparation of Hydrotreating Catalyst c

With the exceptions of altering the amount of basic nickel carbonate to 12 g and altering the amount of basic cobalt carbonate to 86 g in the fourth step, a hydrotreating catalyst c was prepared in the same manner as Example 5. For the activated metal components within the hydrotreating catalyst c, the molybdenum had a $MoO_3$-equivalent concentration of 18.0% by mass, the cobalt had a CoO-equivalent concentration of 4.0% by mass, and the nickel had a NiO-equivalent concentration of 0.5% by mass.

Example 8

Preparation of Hydrotreating Catalyst d (First Step)
A 100 L tank fitted with a steam jacket was charged with 8.18 kg of a sodium aluminate aqueous solution having an $Al_2O_3$-equivalent concentration of 22% by mass, and the aqueous solution was then diluted with 28 kg of ion-exchanged water. Subsequently, 4.8 kg of a trisodium phosphate solution with a $P_2O_5$-equivalent concentration of 2.5% by mass and 3.6 kg of a sodium silicate solution with a $SiO_2$-equivalent concentration of 5.0% by mass were added to the tank under constant stirring, and the resulting mixed solution was heated to 60° C. to obtain a carrier preparation solution.

Further, a separate 50 L container was charged with 12.86 kg of an aluminum sulfate aqueous solution having an $Al_2O_3$-equivalent concentration of 7% by mass, and the aqueous solution was then diluted with 23 kg of ion-exchanged water. Subsequently, using a roller pump, the diluted aluminum sulfate solution was added to the above-mentioned carrier preparation solution at a constant rate until a pH of 7.2 was reached, thus preparing a hydrate slurry.

(Second Step)
The obtained hydrate slurry was aged for one hour at 60° C. under constant stirring, was subsequently dewatered using a flat filter, and was then washed with 150 L of a 0.3% by mass aqueous solution of ammonia. The washed cake-like slurry was diluted with ion-exchanged water to achieve an $Al_2O_3$ concentration of 10% by mass, and the pH was then adjusted to 10.5 by adding 22% by mass ammonia water.

The resulting pH-adjusted slurry was transferred to an ageing tank fitted with a reflux condenser, and the slurry was then heated at 95° C. for 10 hours under constant stirring. Following ageing, the slurry was dewatered, and a double arm kneader fitted with a steam jacket was then used to knead the slurry while the water content was concentrated down to a predetermined level. Subsequently, 340 g of boric acid was added, and the resulting mixture was once again kneaded while the water content was concentrated down to a predetermined level, thus yielding a carrier-forming material.

(Third Step)
The obtained carrier-forming material was molded into circular cylindrical pellets having a diameter of 1.8 mm and a length of 2 to 3 mm using an extrusion molding apparatus, and the molded pellets were then dried at 110° C. Subsequently, the dried molded product was calcined for 3 hours at a temperature of 550° C. in an electric furnace, thus yielding a carrier. The $SiO_2$ concentration within this carrier was 5.6% by mass, the $P_2O_5$ concentration was 3.8% by mass, and the $B_2O_3$ concentration was 6.0% by mass.

The fourth and fifth steps were then performed in the same manner as Example 5, yielding a hydrotreating catalyst d. For the activated metal components within the hydrotreating catalyst d, the molybdenum had a $MoO_3$-equivalent concentration of 18% by mass, the cobalt had a CoO-equivalent concentration of 3.5% by mass, and the nickel had a NiO-equivalent concentration of 1.0% by mass. Further, the average stacking number for molybdenum sulfide slab in the hydrotreating catalyst d was 1.3.

Comparative Example 7

Preparation of Hydrotreating Catalyst e

With the exception of not using the boric acid in the second step, a hydrotreating catalyst e was prepared in the same manner as Example 5. For the activated metal components within the hydrotreating catalyst e, the molybdenum had a $MoO_3$-equivalent concentration of 18% by mass, the cobalt had a CoO-equivalent concentration of 3.5% by mass, and the nickel had a NiO-equivalent concentration of 1.0% by mass. Further, the average stacking number for molybdenum sulfide slab in the hydrotreating catalyst e was 1.8.

Comparative Example 8

Preparation of Hydrotreating Catalyst f

With the exception of not using the trisodium phosphate in the preparation of the carrier in the first step, a hydrotreating catalyst f was prepared in the same manner as Example 5. For the activated metal components within the hydrotreating catalyst f, the molybdenum had a $MoO_3$-equivalent concentration of 18% by mass, the cobalt had a CoO-equivalent concentration of 3.5% by mass, and the nickel had a NiO-equivalent concentration of 1.0% by mass. Further, the average stacking number for molybdenum sulfide slab in the hydrotreating catalyst f was 1.5.

Comparative Example 9

Preparation of Hydrotreating Catalyst g

With the exception of not using the sodium silicate solution in the preparation of the carrier in the first step, a hydrotreating catalyst g was prepared in the same manner as Example 5. For the activated metal components within the hydrotreating catalyst g, the molybdenum had a $MoO_3$-equivalent concentration of 18% by mass, the cobalt had a CoO-equivalent concentration of 3.5% by mass, and the nickel had a NiO-equivalent concentration of 1.0% by mass. Further, the average stacking number for molybdenum sulfide slab in the hydrotreating catalyst g was 2.2.

Comparative Example 10

Preparation of Hydrotreating Catalyst h

With the exception of not using the nickel carbonate during the metal supporting performed in the fourth step, a hydrotreating catalyst h was prepared in the same manner as Example 5. For the activated metal components within the hydrotreating catalyst h, the molybdenum had a MoO$_3$-equivalent concentration of 18% by mass, and the cobalt had a CoO-equivalent concentration of 3.5% by mass. Further, the average stacking number for molybdenum sulfide slab in the hydrotreating catalyst h was 1.4.

Comparative Example 11

Preparation of Hydrotreating Catalyst i

With the exception of not using the cobalt carbonate during the metal supporting performed in the fourth step, a hydrotreating catalyst i was prepared in the same manner as Example 5. For the activated metal components within the hydrotreating catalyst i, the molybdenum had a MoO$_3$-equivalent concentration of 18% by mass, and the nickel had a NiO-equivalent concentration 1.0% by mass. Further, the average stacking number for molybdenum sulfide slab in the hydrotreating catalyst i was 1.5.

Comparative Example 12

Preparation of Hydrotreating Catalyst j

With the exception of altering the final temperature to 400° C. in the fifth step, a hydrotreating catalyst j was prepared in the same manner as Example 5. For the activated metal components within the hydrotreating catalyst j, the molybdenum had a MoO$_3$-equivalent concentration of 18% by mass, the cobalt had a CoO-equivalent concentration of 3.5% by mass, and the nickel had a NiO-equivalent concentration of 1.0% by mass. Further, the average stacking number for molybdenum sulfide slab in the hydrotreating catalyst j was 2.8.

[Hydrotreating of Hydrocarbon Oil]

Using each of the above-mentioned hydrotreating catalysts a to j, a vacuum gas oil was hydrotreated in the manner described below, and the desulfurization activity was evaluated.

Each of the hydrotreating catalysts (100 ml) was packed in a fixed bed reactor, and a vacuum gas oil (boiling point range: 343 to 550° C., sulfur content: 2.44% by mass, nitrogen content: 0.085% by mass) was supplied to the fixed bed reactor at a rate of 200 ml/hour to effect hydrotreatment. The reaction conditions during the hydrotreatment included a hydrogen partial pressure of 6 MPa, a liquid hourly space velocity of 2.0 h$^{-1}$, a hydrogen/oil ratio of 2,500 scfb, and a reaction temperature of either 340° C. or 360° C.

The results for the desulfurization rate and denitrification rate at each of the reaction temperatures are shown in Table 2.

The desulfurization rate was calculated using the formula: (sulfur content removed by hydrotreating/sulfur content within vacuum gas oil)×100(%). The denitrification rate was calculated using the formula: (nitrogen content removed by hydrotreating/nitrogen content within vacuum gas oil)×100 (%).

TABLE 2

| Hydrotreating catalyst | | Desulfurization rate (% by mass) | | Denitrification rate (% by mass) | |
|---|---|---|---|---|---|
| | | 340° C. | 360° C. | 340° C. | 360° C. |
| Example 5 | a | 79 | 91 | 25 | 43 |
| Example 6 | b | 76 | 89 | 24 | 42 |
| Example 7 | c | 77 | 90 | 23 | 41 |
| Example 8 | d | 78 | 91 | 24 | 43 |
| Comparative Example 7 | e | 74 | 87 | 19 | 36 |
| Comparative Example 8 | f | 73 | 87 | 20 | 37 |
| Comparative Example 9 | g | 69 | 85 | 19 | 36 |
| Comparative Example 10 | h | 75 | 88 | 20 | 37 |
| Comparative Example 11 | i | 65 | 79 | 18 | 36 |
| Comparative Example 12 | j | 69 | 86 | 20 | 37 |

The hydrotreating catalysts a to d of Examples 5 to 8, each of which was produced via the first to fifth steps of aspect [6] of the present invention, had an average stacking number for molybdenum sulfide slab of not more than 1.9. By performing hydrotreating using these catalysts, the sulfur content and the nitrogen content within the vacuum gas oil were able to be effectively removed.

In the case of the hydrotreating catalyst e of Comparative Example 7 that was produced without adding boric acid in the second step, the hydrotreating catalyst f that was produced without adding trisodium phosphate in the first step, and the hydrotreating catalyst g that was produced without adding sodium silicate in the first step, the denitrification rate was lower than that observed in the examples. Further, the desulfurization rate was also lower for the hydrotreating catalyst f of Comparative Example 8.

In the case of the hydrotreating catalyst h of Comparative Example 10 that was produced without adding nickel carbonate in the fourth step, and the hydrotreating catalyst i of Comparative Example 11 that was produced without adding cobalt carbonate in the fourth step, both the desulfurization rate and the denitrification rate were lower than those observed in the examples.

In the case of the hydrotreating catalyst j of Comparative Example 12 that was produced with the final temperature in the presulfiding treatment of the fifth step increased to a temperature higher than 380° C., the average stacking number for molybdenum sulfide slab exceeded 1.9, and both the desulfurization rate and the denitrification rate were lower than those observed in the examples.

INDUSTRIAL APPLICABILITY

A hydrotreating catalyst of the present invention exhibits excellent levels of both desulfurization activity and denitrification activity. Further, a process for producing a hydrotreating catalyst according to the present invention enables a hydrotreating catalyst having excellent levels of both desulfurization activity and denitrification activity to be produced with comparative ease. Moreover, a process for hydrotreating a hydrocarbon oil according to the present invention enables a sulfur content and a nitrogen content to be effectively removed. Accordingly, the present invention is extremely useful industrially.

The invention claimed is:

1. A hydrotreating catalyst being a calcined product comprising:
   a carrier comprising aluminum, silicon, phosphorus and boron; and molybdenum, cobalt and nickel supported on the carrier; wherein, relative to 100% by mass of the carrier, (a) an aluminum content in the carrier in terms of aluminum oxide ($Al_2O_3$) is 75% or more, (b) a silicon content in the carrier in terms of silicon oxide ($SiO_2$) is 0.2% or more and 10.0% or less, (c) a phosphorus content in the carrier in terms of phosphorus oxide ($P_2O_5$) is 1.0% or more and 5.0% or less, and (d) a boron content in the carrier in terms of boron oxide ($B_2O_3$) is 3.0% or more and 7.0% or less, wherein the hydrotreating catalyst is calcined before a presulfiding treatment, and an average stacking number for a molybdenum sulfide slab is greater than 1.0 but not more than 1.9.

2. The hydrotreating catalyst being a calcined product according to claim 1, wherein, relative to 100% by mass of the carrier, (e) a molybdenum content in terms of molybdenum oxide ($MoO_3$) is 10% or more and 23% or less, (f) a cobalt content in terms of cobalt oxide (CoO) is 1.0% or more and 5.0% or less, and (g) a nickel content in terms of nickel oxide (NiO) is 0.2% or more and 0.3% or less.

3. A process for producing the hydrotreating catalyst according to claim 1, the process comprising subjecting a catalyst precursor, prepared by supporting molybdenum, cobalt and nickel on a carrier comprising aluminum, silicon, phosphorus and boron, to a presulfiding treatment such that an average stacking number for molybdenum sulfide slab following sulfidization is greater than 1.0 but not more than 1.9.

4. A process for hydrotreating a hydrocarbon oil, the process comprising bringing the hydrocarbon oil into contact with the hydrotreating catalyst according to claim 1 in the presence of hydrogen.

5. A process for producing the hydrotreating catalyst according to claim 1, the process comprising:

a first step of mixing an acidic aluminum salt aqueous solution and a basic aluminum salt aqueous solution in presence of phosphate ions and silicate ions to achieve a pH of 6.5 to 9.5, thereby obtaining a hydrate, a second step of adding boron to the hydrate to prepare a carrier-forming material, a third step of molding and calcining the carrier-forming material to obtain a carrier, a fourth step of supporting molybdenum, cobalt and nickel on the carrier to obtain a catalyst precursor, wherein calcination occurs after incorporation of the molybdenum, cobalt and nickel into the carrier, and a fifth step of performing a presulfiding treatment by bringing the catalyst precursor into contact with a mixed gas comprising hydrogen and hydrogen sulfide under conditions including a pressure of not less than 2.0 MPa and a maximum temperature of 240 to 380° C.

6. The process for producing a hydrotreating catalyst according to claim 5, wherein the supporting of molybdenum, cobalt and nickel on the carrier is performed in presence of phosphoric acid and a carboxylic acid compound.

7. A process for hydrotreating a hydrocarbon oil, the process comprising bringing the hydrocarbon oil into contact with the hydrotreating catalyst according to claim 2 in the presence of hydrogen.

8. A hydrotreating catalyst produced by a process for producing a hydrotreating catalyst, the process comprising:

a first step of mixing an acidic aluminum salt aqueous solution and a basic aluminum salt aqueous solution in the presence of phosphate ions and silicate ions to achieve a pH of 6.5 to 9.5, thereby obtaining a hydrate, a second step of adding boron to the hydrate to prepare a carrier-forming material, a third step of molding and calcining the carrier-forming material to obtain a carrier, a fourth step of supporting molybdenum, cobalt and nickel on the carrier to obtain a catalyst precursor, wherein calcination occurs after incorporation of the molybdenum, cobalt and nickel into the carrier, and a fifth step of performing a presulfiding treatment by bringing the catalyst precursor into contact with a mixed gas comprising hydrogen and hydrogen sulfide under conditions including a pressure of not less than 2.0 MPa and a maximum temperature of 240 to 380° C., wherein an average stacking number for a molybdenum sulfide slab is greater than 1.0 but not more than 1.9.

9. A process for hydrotreating a hydrocarbon oil, the process comprising bringing the hydrocarbon oil into contact with the hydrotreating catalyst according to claim 8 in the presence of hydrogen.

* * * * *

UNITED STATES PATENT AND TRADEMARK OFFICE
CERTIFICATE OF CORRECTION

| | | |
|---|---|---|
| PATENT NO. | : 8,962,514 B2 | Page 1 of 1 |
| APPLICATION NO. | : 13/138774 | |
| DATED | : February 24, 2015 | |
| INVENTOR(S) | : Hiroyuki Seki et al. | |

It is certified that error appears in the above-identified patent and that said Letters Patent is hereby corrected as shown below:

In the specification

Column 2, line 9, change "activity, butalso a high" to -- activity, but also a high --.

Signed and Sealed this
Twenty-fourth Day of November, 2015

Michelle K. Lee
*Director of the United States Patent and Trademark Office*